United States Patent [19]

Guenon

[11] 4,095,701
[45] Jun. 20, 1978

[54] HILLSIDE BALE WAGON

[75] Inventor: Jean-Pierre Guenon, Plombieres-lez-Dijon, France

[73] Assignee: Sperry Rand Corporation, New Holland, Pa.

[21] Appl. No.: 782,595

[22] Filed: Mar. 29, 1977

[30] Foreign Application Priority Data

Apr. 1, 1976 United Kingdom ............... 13223/76

[51] Int. Cl.² ............................................. A01D 87/12
[52] U.S. Cl. ..................................... 214/6 B; 214/6 C
[58] Field of Search ................................ 214/6 B, 6 C

[56] References Cited

U.S. PATENT DOCUMENTS

| 3,446,369 | 5/1969 | May et al. | 214/6 B |
| 3,549,023 | 12/1970 | Backman | 214/6 B |
| 3,920,133 | 11/1975 | Butler et al. | 214/6 B |

Primary Examiner—Drayton E. Hoffman
Assistant Examiner—Ross Weaver
Attorney, Agent, or Firm—John B. Mitchell; Frank A. Seemar; Joseph A. Brown

[57] ABSTRACT

The invention comprises improvements to an automatic bale wagon of the type having a load table for receiving bales thereon and being pivotable between a bale-receiving position and a bale-unloading position for transferring bales loaded thereon onto a further component. The invention enables to use such bale wagons on slopes transverse to the longitudinal axis thereof and comprises retractable bale-retaining means associated with the load table and operable to maintain bales deposited on the load table in a predetermined position when moving from its bale-receiving position to its bale-unloading position.

13 Claims, 13 Drawing Figures

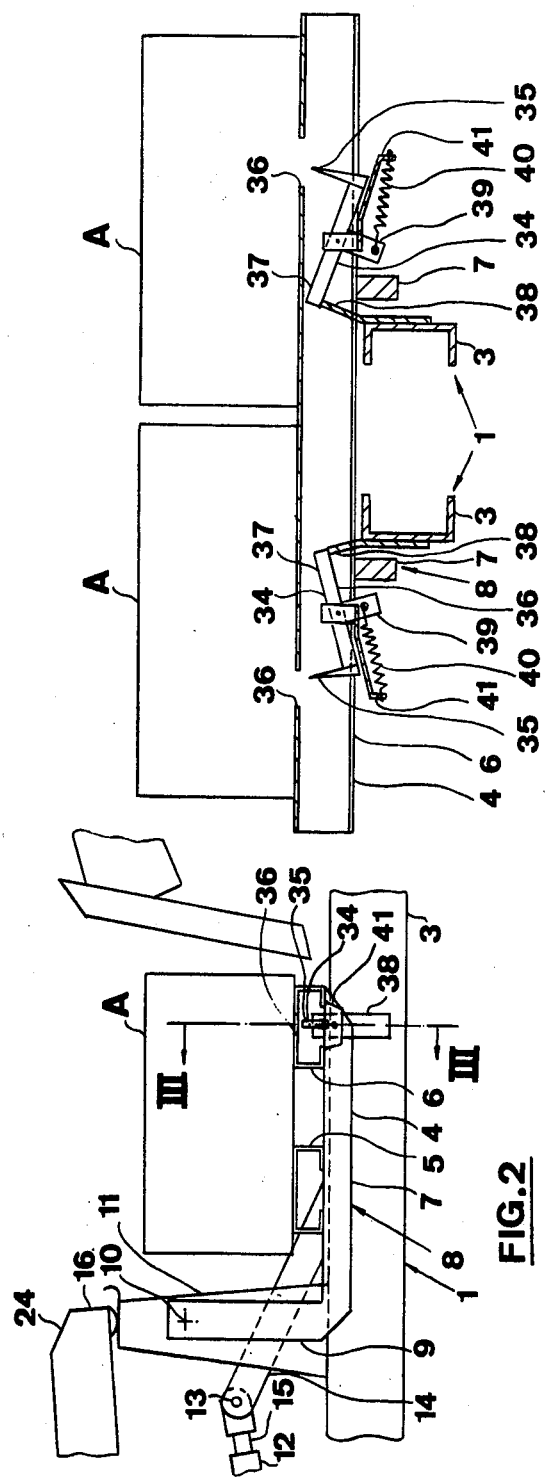

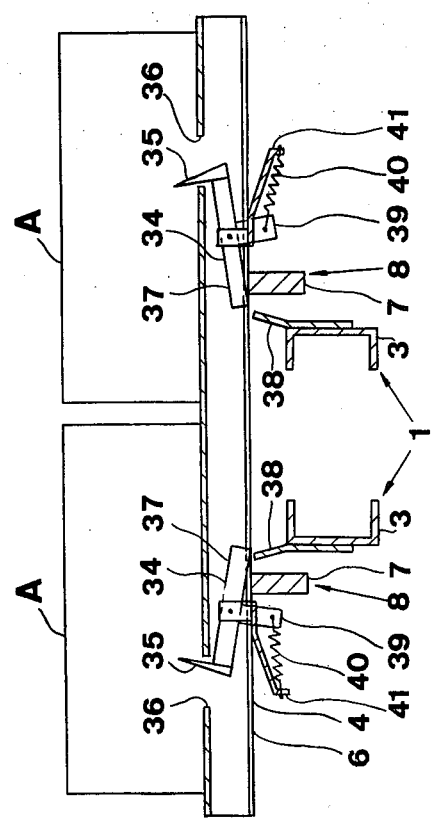
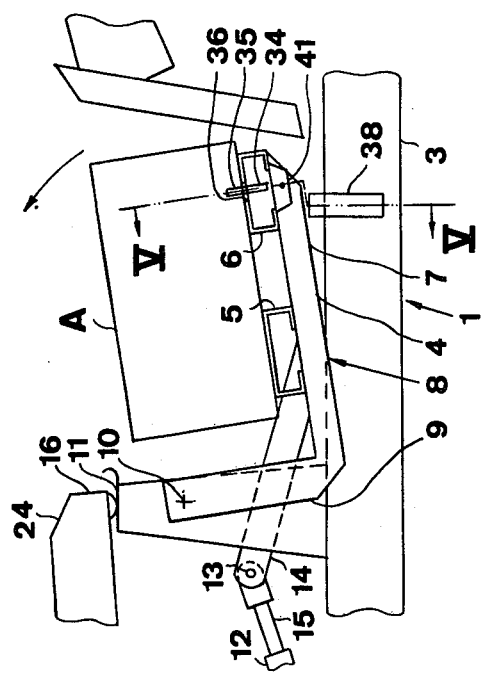
FIG.5
FIG.4

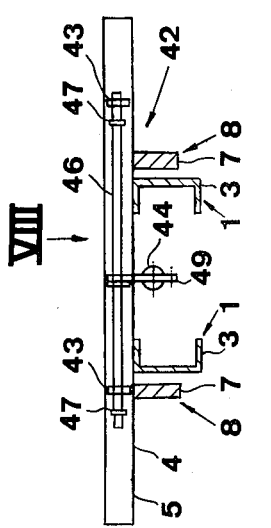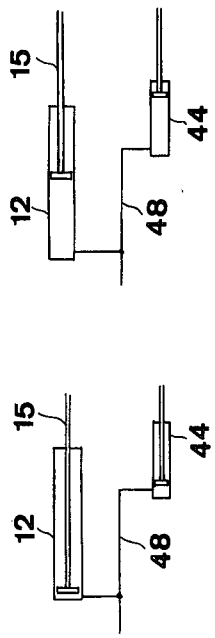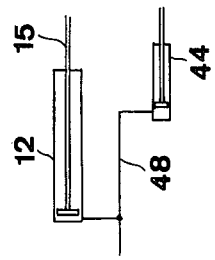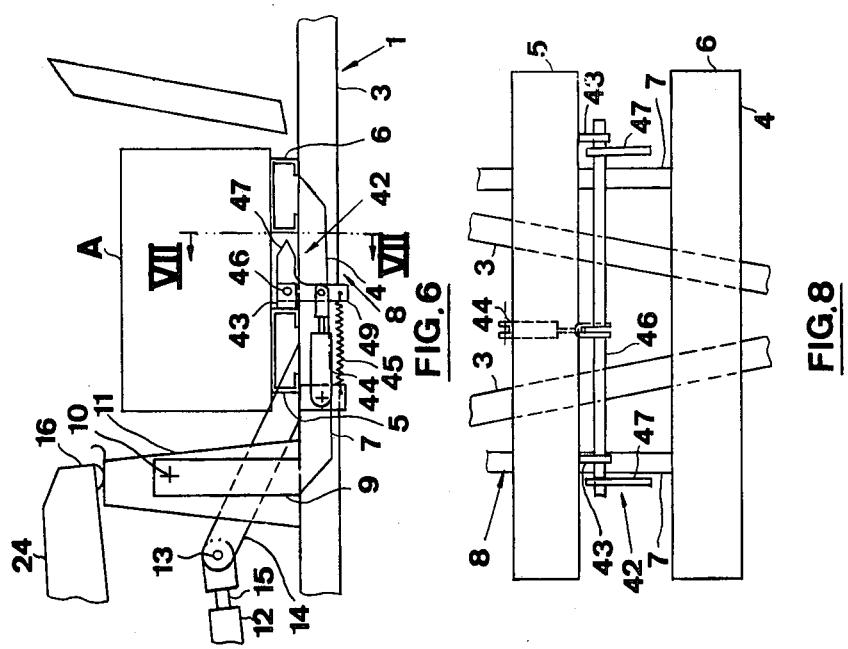

HILLSIDE BALE WAGON

BACKGROUND OF THE INVENTION

1. Field of the Invention

The present invention relates generally to agricultural equipment and more specifically to bale wagons.

2. Description of the Prior Art

With the trend in farming practices towards increased mechanisation, the automatic bale wagon, such as the type illustrated in U.S. Pat. No. 3,610,442 and Canadian Pat. No. 902,003 has been gaining in acceptance as an essential farm implement. In these bale wagons, bales are loaded onto a first receiving table which sequentially moves two or more bales in end-to-end relationship onto a second transfer table, whereupon a tier of bales is accumulated. When a full complement of bales for a tier has been loaded upon the second transfer table, the latter is elevated from a somewhat horizontal position to a substantial vertical position to dispose the tier of bales either against a rolling rack upon a load bed of wagon or against the forward face of a previously deposited tier of bales. All operations of the various receiving and transfer tables, rolling rack and final unloading of the load bed are accomplished by hydraulic means and associated fluid circuits and control valves which are operated by appropriate cams, trip members and other means such as described in detail in the aforementioned patent specification.

After accumulating successive bale tiers to form a completed bale stack on the load bed, the bale stack may be transported to a desired location for discharge from the wagon in a composite stack. Bale wagons have now evolved to the point where not only can they pick up individual bales in the field and stack them or retrieve an entire stack, but they are also able automatically to unload the wagon one bale at a time.

Bale wagons of the types hereinbefore described are generally satisfactory when operating in generally flat fields. However, when using these bale wagons in hilly conditions, certain problems are encountered. One problem occurs when operating on slopes transverse to the longitudinal axis of the bale wagon. Bales loaded on the first receiving table occasionally move too far to the one or other side. This movement often occurs during the transfer of the bales from the first receiving table to the second transfer table, whereby bales may either fall onto the ground or may become arranged in an irregular or loose tier on the transfer table. An irregular or loose tier may result in bales falling onto the ground as soon as the second transfer table starts cycling. Even if no bales fall to the ground, other problems may be encountered; for example an irregular and loose pattern on the second transfer table will result in an unstable load on the load rack which in turn results in unstable stacks in the case of a stacking wagon. Also, bales in the front tier of the stack on the load bed may tend to fall back on the second transfer table, thereby disturbing the entire automatic loading operation. In the case of a bale wagon comprising a bale-by-bale unloading mechanism, similar problems may occur during the unloading process.

When the bale wagon is operated on an upward incline, then the bales which are transferred from the first receiving table onto the second transfer table have a tendency either to roll or slide rearwardly on the second transfer table. This results, of course, in an irregular tier and a disturbance of the automatic operation of the wagon as the second table strip member may be actuated prematurely. The operator then has to stop the wagon when this occurs and unload the irregular tier manually and re-arrange the bales on the second transfer table.

SUMMARY OF THE INVENTION

It is the primary object of the present invention to overcome or attenuate one or more of the aforementioned disadvantages of the known bale wagons.

According to the present invention, a bale wagon is provided having a load table for receiving bales thereon and being pivotable between a bale-receiving position and a bale-unloading position; and first retractable bale-retaining means operable to maintain bales deposited on the load table in a predetermined position when moving from its bale-receiving position to its bale-unloading position.

Preferably the first retractable bale-retaining means are in the form of fingers pivotally mounted on the underside of the load table and arranged to project through apertures therein. The fingers may be spring loaded and have one end cooperable with adjustable stops on the framework of the wagon. When the load table is in its loading position, the ends of the fingers abut against the stops and are retracted thereby so, that bales can be loaded on to the load table without any interference from the bale-retaining fingers. When the load table is pivoted to off-load the bales thereon, the stops are disengaged by this movement and the fingers project through the table under the action of the springs, thereby retaining the bales in the desired position during transferal.

The load table may off-load bales onto a transfer table which is provided with second retractable bale-retaining means operable to retain thereon bales received from the load table. The second bale-retaining means may be in the form of plurality of rearwardly projecting arms pivotally mounted at their forward ends on the framework of the wagon and releasably engageable with the top of the front layer of bales on the transfer table.

BRIEF DESCRIPTION OF THE DRAWINGS

Bale wagons embodying the present invention will now be described in greater detail, by way of example, with reference to the accompanying drawings in which:

FIG. 2 is a partial view, on a larger scale, of the portion indicated at II in FIG. 1, with certain components omitted, FIG. 3 is a sectional view taken along the lines III—III of FIG. 2, FIG. 4 is a view similar to FIG. 2 but with the components in a different operative position, FIG. 5 is a sectional view taken along the lines V—V of FIG. 4, FIG. 6 is a view similar to FIG. 2 but of another embodiment, FIG. 7 is a sectional view taken along the lines VII—VII of FIG. 6, FIG. 8 is a view in the direction of arrow VIII in FIG. 7, FIGS. 9 and 10 are schematic views of hydraulic components as used in FIGS. 6, 7 and 8.

DETAILED DESCRIPTION OF THE INVENTION

In General

Figure 1:
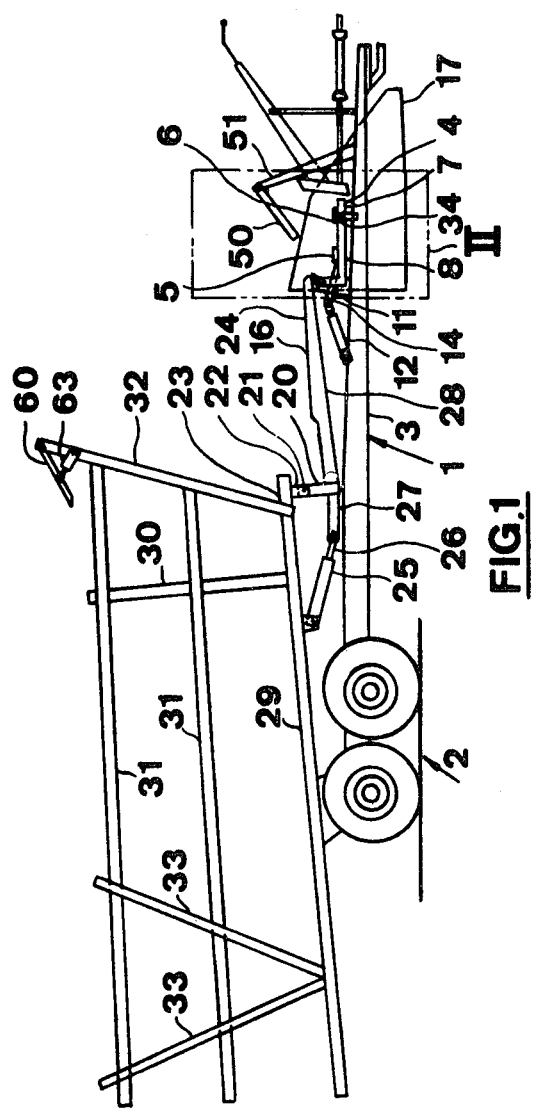
FIG. 1 is a side elevation of the bale wagon.

The basic features of the bale wagons to be described are set forth hereinafter to an extent sufficient for the present invention to be appreciated and understood. However, certain components, in particular the hydraulic system by which the various elements of the bale wagon are activated and controlled, are shown only diagrammatically. Operation of certain of these elements, especially the control valves for the hydraulic cylinder units, is initiated by certain trip mechanisms, cams, etc., the details of which are not shown in the drawings of the present application but are illustrated and described in U.S. Pat. No. 3,610,442 and Canadian Pat. No. 902,003, to which attention is directed for a more complete description and illustration of the same.

Referring to the accompanying drawings and particularly to FIG. 1, the bale wagon comprises a chassis, indicated generally at 1, mounted on two pairs of wheels, only the right hand ones 2 being seen in FIG. 1. The chassis 1 is formed of left- and right-hand, longitudinally-extending rails 3 of which only one is seen. Although it is not specifically shown, the forward ends of the longitudinally extending rails 3 converge in a clevis assembly which adapts the wagon to be secured to a tractor (not shown), or other towing vehicle, located at the front thereof. Power for the wagon is obtained from the tractor power-take-off in a conventional manner, but not specifically shown.

Mounted at the forward end of the chassis 1 and extending transversely thereof is a first load on receiving table 4 comprising two transversely-extending beams 5 and 6 which are mounted on a forwardly-extending horizontal portion 7 of an L-shaped structure indicated generally at 8. The L-shaped structure 8 includes a rear, upwardly-extending leg portion 9 which is pivotally secured at 10 to spaced brackets 11, only one of which is shown, mounted on the right- and left-hand side rails 3. A hydraulic actuator 12 is pivotally secured by a pivot pin to the framework of the bale wagon. The rod 15 of the cylinder 12 is pivotally secured at 13 to an arm 14 which is welded, or otherwise secured, to the L-shaped member 8 of the receiving table 4. As the actuator 12 is extended, the receiving table 4 is swung upwardly about its pivot point 10, thereby transferring any bales which have been accumulated on the table (such as bales A) onto a second, or transfer table 16.

It will be understood by those skilled in the art that the bales A are first introduced to the receiving table 4 by means of a pick-up 17 which lifts bales from the ground and directs them to the receiving table 4.

The transfer table 16 is also mounted on a pair of L-shaped structures 28, each having a forwardly-extending leg portion and an upwardly-extending rear leg portion 20 which is disposed at right angles to the lower leg portion. Each of the upwardly-extending leg portions 20 is secured by a pivot pin 21 to a depending lug 22 mounted on the forward end of a load bed 23. A bed surface 24 of the transfer table 16 is formed across the forwardly-extending leg portions and provides a surface upon which bale tiers are formed. When the transfer table 16 is in its normal tierforming position, it is disposed in the position shown in FIG. 1. A hydraulic actuator 25 is secured by a pivot pin to the load bed 23, with the rod end 26 of the actuator pivotally connected by a pivot pin to a rearwardly-extending member 27 fixed by its forward end to the rear portion of the L-shaped structure 28. The load bed 23 includes a platform assembly 29.

When the requisite number of bales has been accumulated on table 16 from the table 4, to form a first tier of bales thereon, the hydraulic actuator 25 is operated by trip means (not shown) so that it extends and causes the table 16 to swing upwardly about its pivot pin 21 through approximately 90°. In this manner, the first bale tier formed on the transfer table 16 is transferred from a generally horizontal position on the table 16 to a generally vertical position on a rearwardly-disposed bed or load table 23 against a rolling rack 30 which is thus forced rearwardly. Successive tiers of bales placed on the load bed 23 by the table 16 will effect further rearward movement of the rack 30 relative to the load bed 23. The bale tiers are laterally confined on the load bed 23 by right- and lefthand side bars 31, only the right hand side shield being shown in FIG. 1. Each of the side bars 31 is supported by upwardly-extending front and rear struts 32, 33 respectively.

The rolling rack 30 is adapted to be advanced forwardly and rearwardly by means of a cable system (not shown). When the operator of the bale wagon desires to unload the wagon one bale at a time, the bale tier last deposited on the load bed 23 is transferred back to the now inclined table 16 by forwardmovement of the rolling rack 23. A cross conveyor (not shown) engages the end bale of the lowermost layer of bales and discharges it from the bale wagon. Bale engaging means (not shown) have previously engaged the layer of bales next to the lowermost layer on the transfer table and shifted them upwardly on the bed surface 24 to permit ready discharge of the lowermost layer. When the lowermost layer has been discharged, the bale engaging means are retracted to allow the previously retained layer to fall and become the lowermost layer for discharge, the bale engaging means then engaging and lifting the next layer. This operation is repeated until the whole tier has been discharged, whereupon the rolling rack is moved further forward to transfer the next tier onto the table 16.

PREFERRED EMBODIMENT

With particular reference to FIGS. 2-5, improvements in the receiving table 4 will now be described in more detail. Pivotally mounted on the lower side of the front traverse beam 6 of the receiving table 4 are a plurality of bale-retaining members 34 having at one end fingers 35 which can project from below through apertures 36 in the beam 6 and having other ends 37 adapted for abutment against adjustable stops 38 on the longitudinally-extending rails 3. Secured between the ends of the members 34 are arms 39 to which one end of the respective springs 40 are attached. The other ends of the springs 40 are secured to support 41 on the beam 6. The springs 40 are arranged so as to urge the fingers 35 to project through the apertures 36. The ends 37 abut against the adjustable stops 38 when the receiving table is in its normal receiving position, thereby retracting the fingers 35, as is best seen in FIG. 3. Thus the bales can easily be loaded on to the receiving table 4 by the pick-up 17 without any interference of the fingers 35. The abutment ends 37 of the members 34 are released from the stops 38 as soon as the actuator 12 starts lifting the receiving table 4 and the springs 40 immediately urge the fingers 35 through the apertures 36 to penetrate the bales A. As a result, the bales A are transferred in a proper manner to the transfer table 16, even in those situations where the wagon is operating on transverse inclines. The bale retaining members 34 thus prevent bales from falling onto the ground during the cycling of the receiving table 4 and ensure that a tight and regular tier is formed on the transfer table 16. This also means that in case of a stacking wagon, stable stacks are formed, and in the case of a bale-by-bale unloading wagon, problems during the unloading cycle are avoided.

Figure 11:
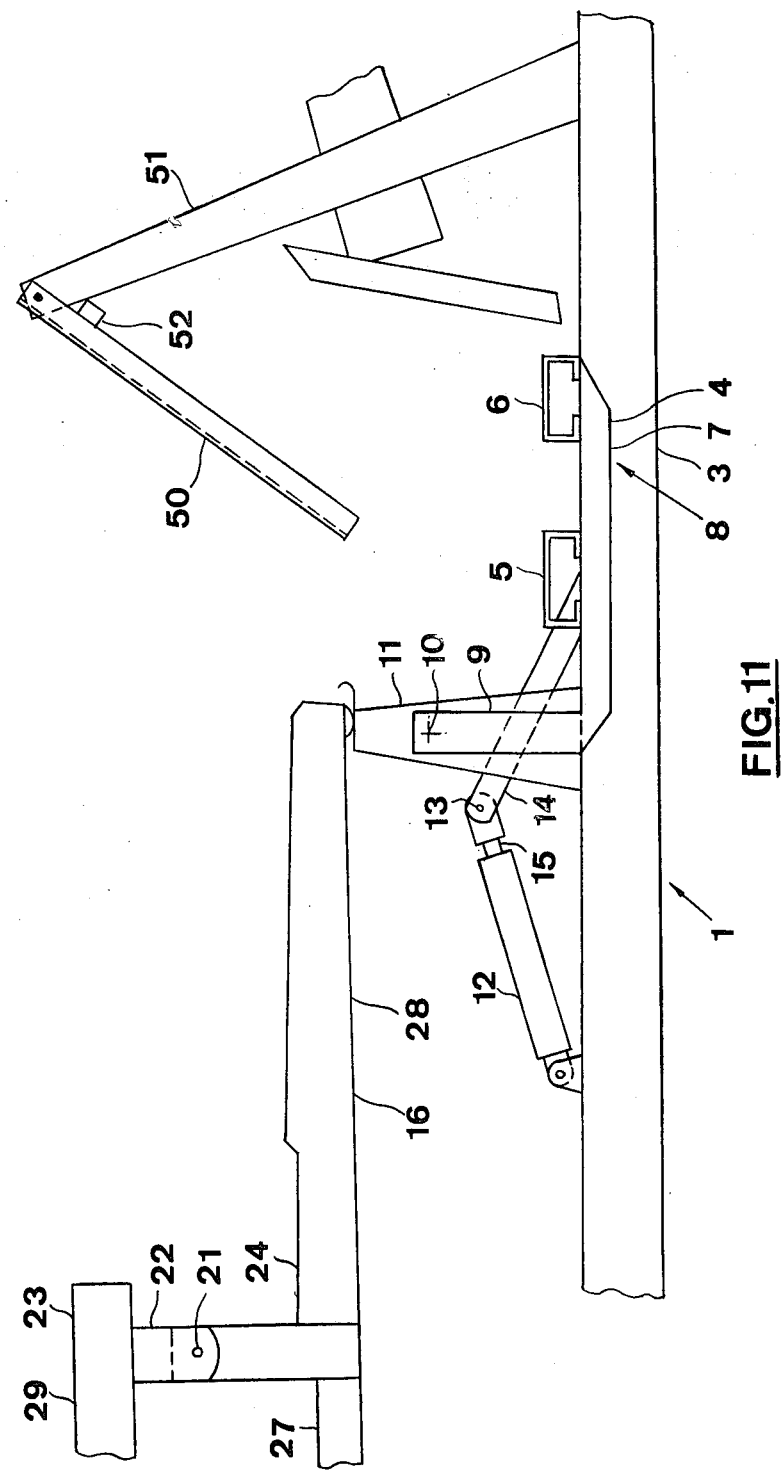
FIG. 11 is a view generally similar to FIG. 2 but to a larger scale and showing components omitted from FIG. 2 and vice versa.
Figure 12:
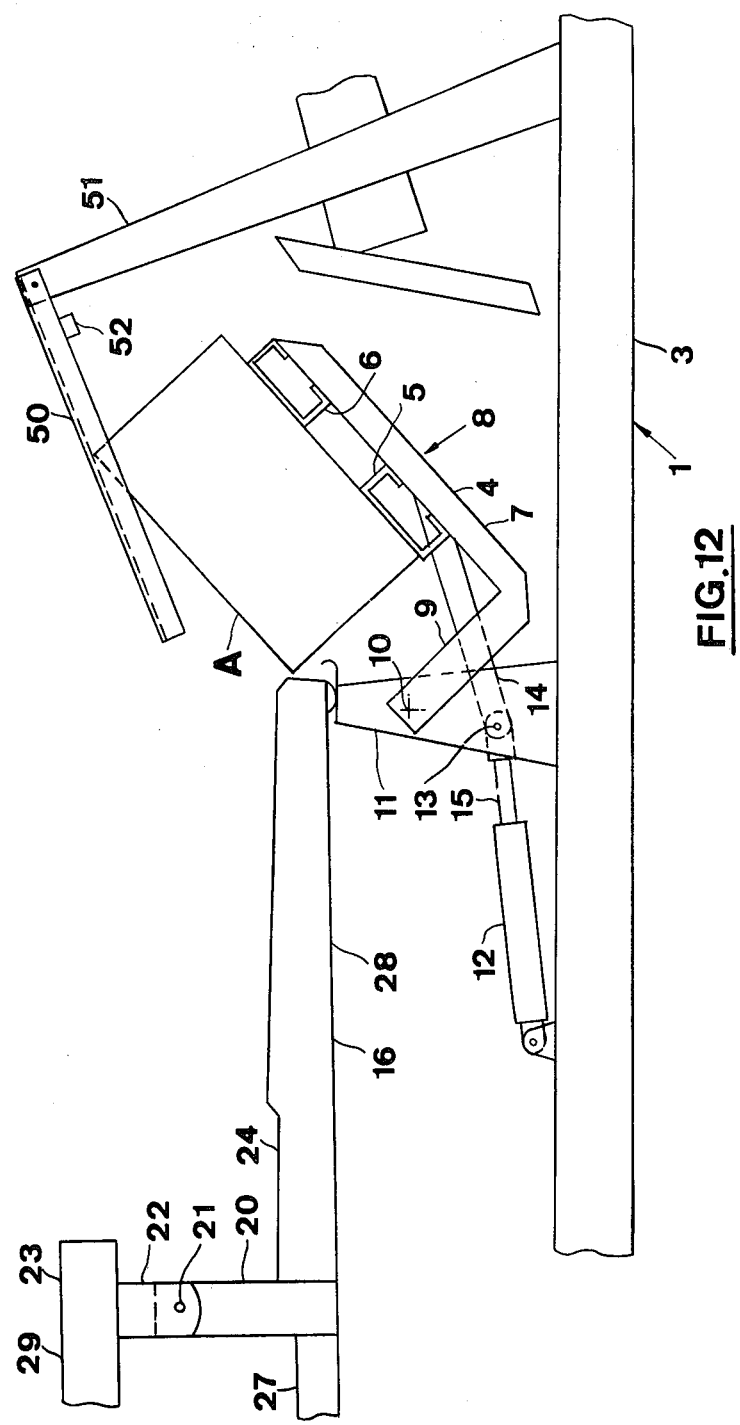
FIGS. 12 and 13 are views similar to FIG. 11 with the components in different operative positions.
Figure 13:
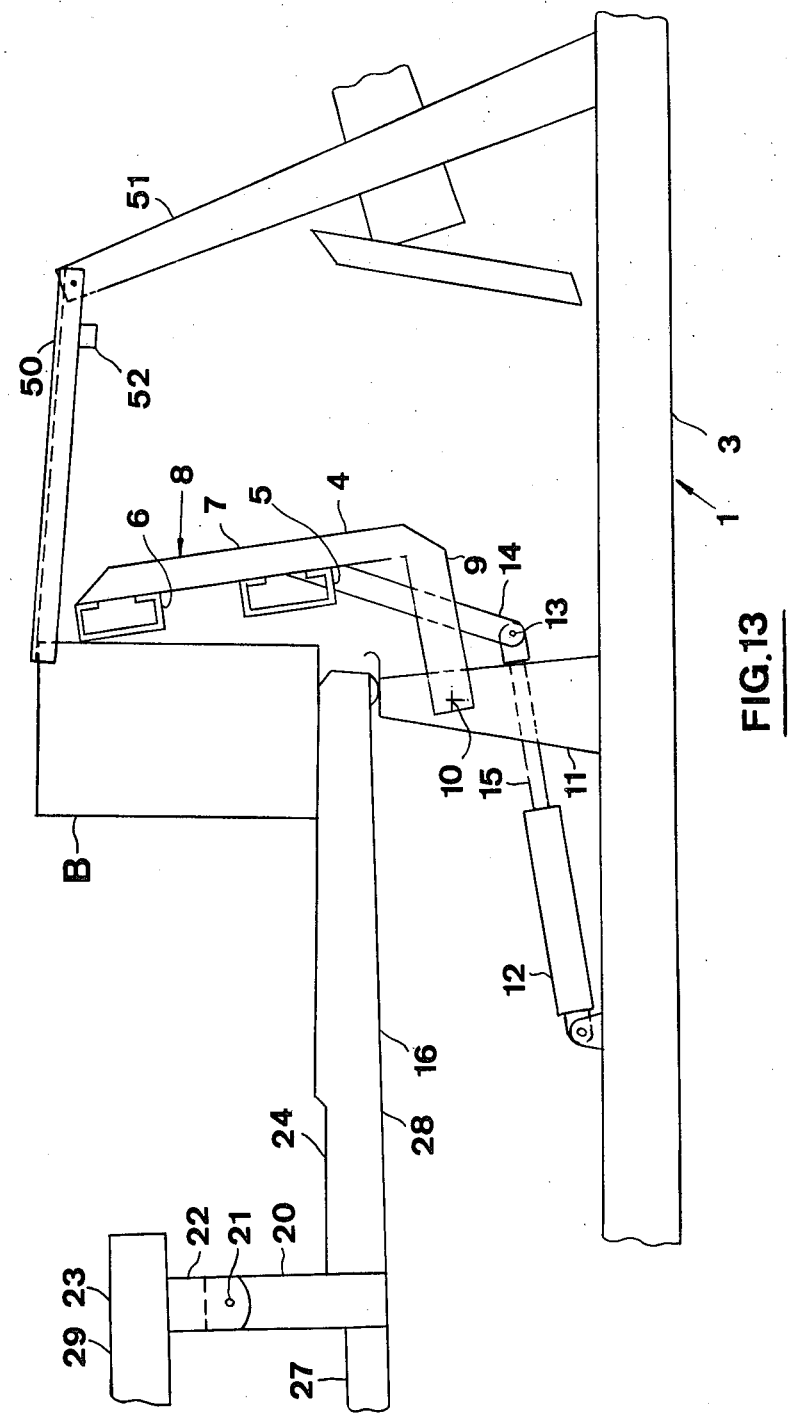

With particular reference now to FIGS. 11 to 13, a future feature of the bale wagon of FIG. 1 is illustrated which feature is particularly useful when the wagon is operated on an upward or downward incline in the direction of the longitudinal axis of the wagon. Bale retaining arms 50 are pivoted at their forward end to a support 51 and the weight of the arms urges them to their lowermost position, as shown in FIG. 11, in which stops 52 on the arms 50 abut against the supports 51. The arms 50 contact the bales A on the receiving table 4 constituting the first bales of a new tier and are raised during the transfer of these bales to the table 16, which is affected by pivotal movement of table 4. This is illustrated in FIG. 12, wherein the receiving table 4 is shown in an intermediate position in the bale transfer cycle. Thus the arms 50 prevent the bales A from moving transversely during transfer to table 16 which is an added advantage when operating on transverse slopes. The arms 50 remain in contact with the transferred bales A (shown as bales B in FIG. 13) and thus retain them in position on the transfer table 16. As other bales are transferred to table 16, the arms 50 engage and retain the forwardmost bales. The contact pressure of the arms 50 may be increased by spring means, for example. It will be appreciated that the arms 50 prevent bales from falling back on the receiving table 4 when the wagon is operated on a downward incline and will restrain bales from rolling or sliding too far rearwardly on the second or transfer table 16 when placed thereon, and when the wagon is operated on an upward incline in the direction of the longitudinal axis of the wagon. It will be clear that the automatic operation of the bale wagon is in no way disturbed by the arms 50 and that tight and regular tiers will be formed on the second or transfer table 16.

MODIFIED EMBODIMENT

FIGS. 6 to 10 show an alternative arrangement of the invention in which the spring-loaded bale-retaining members 34 of FIGS. 2 to 5 are replaced by hydraulically-controlled bale retaining means 42. The means 42 comprise a rock shaft 46 which is pivotally mounted in brackets 43 on the beam 5, fingers 47 which can penetrate into the bales through the openings between the transverse beam 5 and 6, and an arm 49 pivotally connected to a hydraulic actuator 44. The actuator 44 is pivotally mounted at its other end on the receiving table 4. A return spring 45 is arranged parallel to the actuator 44 between the member 42 and the receiving table 4. The hydraulic actuator 44 is arranged hydraulically in parallel with the actuator 12 by pressure line 48 (FIGS. 9 and 10) and when not activated, the pistons of both actuators are retracted. This means that also the fingers 47 are in a retracted, non-operative position. The actuator 44 requires less force to effect extension and hence, when pressure is supplied in pressure line 48 for lifting the receiving table 4, the piston of the actuator 44 will be extended first. This means, that the fingers 47 will penetrate the bales A before the receiving table 4 starts cycling and hence retain the bales in position irrespective of the nature of the terrain on which the bale wagon is operating. When the bales have been transferred to the transfer table 16, the pressure in pressure line 48 is interrupted and the receiving table 4 returned to its normal receiving position. At the same time, the return sprint 45 causes the piston of actuator 44 and the fingers 47 to retract, whereby the table is ready to receive further bales from the pick-up 17.

It will be understood that, while with reference especially to FIGS. 1 to 10, the bale retaining fingers 34 have been described in connection with the first load table 4, it is obvious that these fingers equally may be provided on the transfer table 16 for holding bales deposited thereon and forming a tier of bales, in a predetermined position during movement of the transfer table toward the load bed. From what preceeds, it will be appreciable that an automatic bale bale wagon according to the invention can be utilized in circumstances whereon the use of conventional automatic bale wagons is practically impossible or wherein the operation thereof is affected considerably. In other words, the problems which otherwise commonly are encountered when operating with an automatic bale wagon on slopes transverse to the longitudinal axis of the wagon and/or on upward inclines on the direction of the longitudinal axis of the wagon, are avoided or at least attenuated to a great extent.

Indeed, when the first receiving table transfers bale to the second transfer table, the bale-retaining fingers associated therewith hold the bales deposited on the receiving table in a predetermined position, thus avoiding the bales to falls off the receiving table during the transfer cycle thereof, and avoiding a loose or irregular tier to be formed on the transfer table as well as all subsequent problems which otherwise resulted from the formation of such a loose as irregular tier. The tendency of the bales to roll or to slide rearwardly on the transfer table when deposited thereon, and when the wagon is operated on an upward incline in longitudinal direction of the machine, is eliminated or at least reduced substantially by the action of the aims, overhanging the receiving table. It is thought that the improvement provided by the present invention and many of its attendant advantages will be understood from the foregoing description and it will be apparent that various changes may be made in the form, construction and arrangement of the parts thereof described without departing from the spirit and scope of the invention or sacrifying all of its material advantages, the forms hereinbefore described being merely exemplary embodiments thereof.

Other aspects of an automatic hillside bale wagon are described and illustrated in co-pending patent application No. 782,578.

Having thus described the invention, what is claimed is:

1. An automatic bale wagon for hauling bales lying in a field comprising:
    a mobile chassis adapted for movement in a forward direction across the field;
    a bale pick-up means mounted on the chassis for picking up bales from the ground during movement of the bale wagon across the field;

a load table for receiving bales picked up from the ground by the bale pick-up means and being pivotable between a bale-receiving position and a bale-unloading position;

further bale receiving means for receiving bales from the load table on movement from the bale-receiving position to the bale-unloading position; and means on the load table movable from an inoperative to an operative position when the load table is moving from its bale-receiving position to its bale-unloading position for retaining a bale deposited on the load table in a predetermined position during said movement of the load table.

2. The automatic bale wagon as recited in claim 1, wherein the bale-retaining means comprise an element pivotally mounted on the underside of the load table and which is adapted to project through an aperture in said load table.

3. The automatic bale wagon as recited in claim 1, wherein the bale-retaining means comprise:
a member pivotally mounted intermediate its ends on the underside of the load table;
a bale-retaining element on one end of said member;
a stop means on the chassis for holding the bale-retaining element in an inoperative, retracted position, when engaged with the opposite end of said member; and
resilient means extending between said opposite end of said member and the load table for, when the stop means is disengaged, pivoting the member under resilient force to a position in which the bale-retaining element projects through an associated aperture in the load table and for engaging a bale on the load table and for retaining it in position.

4. The automatic bale-wagon as recited in claim 3 wherein movement of the load table from the bale-receiving position to the bale-unloading position disengages said pivot member from said stop means to render the associated bale-retaining element operative; and movement of the load table in the reverse direction effects re-enegagement of the pivot member with the stop means and consequential retraction of the associated element.

5. In an automatic bale wagon for handling bales lying in the field and having a mobile chassis; bale pick-up means, a load table, a transfer table and a load bed; the bale pick-up means being arranged for picking up bales from the ground during movement of the wagon across the field and for loading said bales in a layer on the load table; the load table being movable between a bale-receiving position and a bale-unloading position in which latter position bales loaded thereon are transferred to the transfer table to form a tier of bales thereon comprising a plurality of layers of bales; the transfer table being movable between a bale-receiving position and a bale-unloading position and arranged to offload a tier of bales formed thereon onto the load bed to form a stack of bales thereon comprising a plurality of tiers of bales; the improvement comprising:
members pivotally mounted intermediate their ends on the underside of the load table;
a bale-retaining element mounted to one end of each pivot member;
stop means on the chassis for cooperation with the other ends of the pivot members when the load table is in its bale-receiving position and for holding the bale-retaining elements in a retracted inoperative position and
resilient means cooperable with the pivot members for when the stop means are disengaged pivoting the members under resilient force to a position in which the bale-retaining elements project through associated apertures in the load table and for engaging bales on the load table and retaining them in position; the movement of the load table from the bale-receiving position to the bale-unloading position disengaging the pivot members from the associated stop means and movement of the load table in the reverse direction effecting re-engagement of the pivot members with the respective stop means and the consequential retraction of the associated elements.

6. The automatic bale wagon as recited in claim 1 wherein the bale retaining means comprise:
a rock shaft pivotally mounted on the underside of the load table;
a bale-retaining element mounted on the rock shaft; and
a first hydraulic actuator means for upon actuation pivoting the rock shaft and causing the bale-retaining element to project through an associated aperture in the load table to engage the bale deposited on said load table and to retain said bale in said predetermined position during said movement of the load table.

7. The automatic bale wagon as recited in claim 6 wherein the bale-retaining means further comprise resilient means for retracting the bale-retaining element on de-actuation of the first hydraulic actuator means.

8. The automatic bale wagon as recited in claim 6 further comprising:
second hydraulic actuator means for moving the load table;
a common hydraulic pressure supply means operatively associated with the first and second hydraulic actuator means for feeding the first and second hydraulic actuator means in parallel; the arrangement being so that the bale-retaining element is rendered operative before any appreciable movement of the load table from the bale-receiving position to the bale-unloading position has taken place, whereby the bale on the load table is retained in position during pivotal movement of the latter.

9. An automatic bale wagon for hauling bales lying in a field comprising:
a mobile chassis adapted for movement in a forward direction across a field;
a bale pick-up means mounted on the chassis for picking up bales from the ground during movement of the bale wagon across the field;
a load table for receiving bales from the pick-up means and being pivotable between a bale-receiving position and a bale-unloading position;
a transfer table mounted to the chassis for cooperation with the load table; the load table being arranged to off load-layers of bales onto the transfer table on movement from the bale-receiving position to the bale-unloading position and to form a tier of bales thereon;
a load bed mounted to the chassis for cooperation with the transfer table; the transfer table being movable between a bale-receiving position and a bale unloading position in which latter position the bale tier formed thereon is transferred to the load bed to form a stack of bales thereon comprising a plurality of tiers of bales, and means on the load table movable from an inoperative to an operative position when the load table is moving from its bale-receiving position to its bale-unloading position for maintaining bales deposited on the load table in a predetermined position during said movement of the load table.

10. The automatic bale wagon as recited in claim 9 also comprising further bale-retaining means on the transfer table for maintaining the tier of bales deposited on the transfer table in a predetermined position during movement of the transfer table from the bale-receiving position to the bale-unloading position.

11. The automatic bale wagon as recited in claim 9 also comprising:

further bale-retaining means pivotally mounted at the forward end thereof on the chassis of the bale wagon and extending rearwardly and releasably engageable with the top of the front layer of bales on the transfer table for refraining said layer of bales from falling off the transfer table or from prematurely moving rearwardly on the transfer table.

12. The automatic bale wagon as recited in claim 11 wherein the rearwardly extending further bale-retaining means in one position thereof overhang the load table and engage bales thereon when the load table is moved from the bale-receiving position to the bale-unloading position, so as further to assist in the retention of bales on the load table during movement thereof, the further bale-retaining means being raised by this movement and remaining in contact with the bales as they are offloaded onto the transfer table for retaining those bales in position on the transfer table with subsequent bales offloaded from the load table displacing the previously offloaded bales on the transfer table and being engaged by the further bale-retaining means.

13. The automatic bale wagon as recited in claim 11 further also comprising means for increasing the contact pressure of the further bale-retaining means on the bales.

* * * * *